United States Patent
Eckard

[11] Patent Number: 5,995,992
[45] Date of Patent: Nov. 30, 1999

[54] CONDITIONAL TRUNCATION INDICATOR CONTROL FOR A DECIMAL NUMERIC PROCESSOR EMPLOYING RESULT TRUNCATION

[75] Inventor: Clinton B. Eckard, Glendale, Ariz.

[73] Assignee: Bull HN Information Systems Inc., Billerica, Mass.

[21] Appl. No.: 08/971,445

[22] Filed: Nov. 17, 1997

[51] Int. Cl.[6] ...................................................... G06F 7/38
[52] U.S. Cl. .................... 708/497; 708/499; 708/551; 712/274; 712/34
[58] Field of Search .................................. 708/204, 497, 708/499, 551; 712/221, 34

[56] References Cited

U.S. PATENT DOCUMENTS

| | | | |
|---|---|---|---|
| 4,384,340 | 5/1983 | Tague et al. | 708/490 |
| 4,942,547 | 7/1990 | Joyce et al. | 708/510 |
| 5,508,948 | 4/1996 | Hatta | 708/204 |
| 5,561,615 | 10/1996 | Kuo et al. | 708/204 |
| 5,787,030 | 7/1998 | Prabhu et al. | 708/650 |
| 5,841,683 | 11/1998 | Bachade et al. | 708/497 |
| 5,892,697 | 4/1999 | Brakefield | 708/496 |

*Primary Examiner*—Kenneth S. Kim
*Attorney, Agent, or Firm*—J. H. Phillips; J. S. Solakian

[57] ABSTRACT

In a coprocessor which processes operands and issues a result word which may include overflow, result and truncation fields and which normally sets a truncation indicator if truncation is employed, the setting of the truncation indicator is inhibited under certain conditions to facilitate later handling of the result. Determinations are made as to whether the result and truncation fields of the result word are zero and as to whether the overflow field is non-zero. If the result and truncation fields are zero, the setting of the truncation indicator is inhibited notwithstanding a non-zero value in the overflow field. Break point position information is processed to obtain masks of bits having logic "1" values for testing the result and truncation fields and logic "0" values for testing the overflow field, the masks then being logically ANDed with the result word. If the result of the ANDing process is a logic "0", the truncation indicator is inhibited from being set.

6 Claims, 6 Drawing Sheets

TO MASK REGISTER 53

CONDITIONAL TRUNCATION INDICATOR CONTROL FOR A DECIMAL NUMERIC PROCESSOR EMPLOYING RESULT TRUNCATION

FIELD OF THE INVENTION

This invention relates to computer central processors and, more particularly, to a decimal numeric coprocessor with enhanced result processing capabilities.

BACKGROUND OF THE INVENTION

Modern mainframe computer systems and also modern workstations and, often, personal computers employ math coprocessors within a central processing unit (CPU) which are especially logically configured to efficiently and somewhat independently perform mathematical computations and hand the result to another part of the central processor or transfer the result to a memory. Other logic manipulation processes ongoing in the CPU are not burdened with this task such that the overall efficiency of the computer system is improved, particularly in performing applications intensive in computations.

Many math coprocessors process operands in increments of a full word, for example, BCD character by BCD character or eight-bit character by eight-bit character. The total result is then "reassembled" in a late stage of the processor. This total result, however, may constitute three components; viz.: the result of actual interest, a higher order overflow portion which may or may not be of interest and a lower order portion which may be subject to truncation. More sophisticated coprocessors track certain characteristics of the actual result including whether truncation has taken place. That is, if truncation has been performed on an actual result, a truncation indicator is set, and this information is supplied to the main processor as a flag which is susceptible to test to determine subsequent action. Typically, if the truncation indicator is set, indicating that a given actual result has been truncated, more processing steps are required than if the result has not been truncated.

There are, however, conditions in which truncation has taken place on a given result, but, for subsequent handling by the CPU, the fact of truncation is irrelevant. For example, the entire unadjusted total result may be all zeros. A more subtle instance is when the actual result field and the truncation field are all zeros, but the overflow field may or may not be all zeros. In both instances, it is desirable to inhibit normal setting of the truncation indicator in order to eliminate later unnecessary special handling of the actual result of a coprocessor operation, and it is to this end that the present invention is directed.

OBJECTS OF THE INVENTION

It is therefore a broad object of this invention to provide, in a central processor including a decimal numeric coprocessor, a feature which deals with overflow and truncation components in a total or intermediate result of a computation with improved efficiency.

It is a more specific object of this invention to provide such a feature that selectively tests and masks off overflow components of an unadjusted total or intermediate coprocessor result in conjunction with effecting a determination as to whether a truncation indicator for the given truncated actual result will be set.

SUMMARY OF THE INVENTION

Briefly, these and other objects of the invention are achieved in a coprocessor which processes operands and issues a raw result which may include overflow, result and truncation fields and which normally sets a truncation indicator if truncation is applied to the raw result. A determination is made as to whether the result and truncation fields are zero, and a determination is made as to whether the overflow field is non-zero. If the result and truncation fields are zero, the setting of the truncation indicator is inhibited notwithstanding a non-zero value in the overflow field. A break point position word indicating the break point between the overflow and result fields is processed to obtain masks of bits having a first logic value (e.g., "1") for the result and truncation fields and a mask of bits having a second logic value (e.g., "0") for the overflow field, the masks for the result and truncation fields then being logically ANDed with the result and truncation fields and the mask for the overflow field being logically ANDed with the overflow field and the results of both logical ANDing process being logically ORed such that if the result of the logical ORing process is a predetermined one (e.g., "0") of the first and second logic values, the truncation indicator is inhibited from being set.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
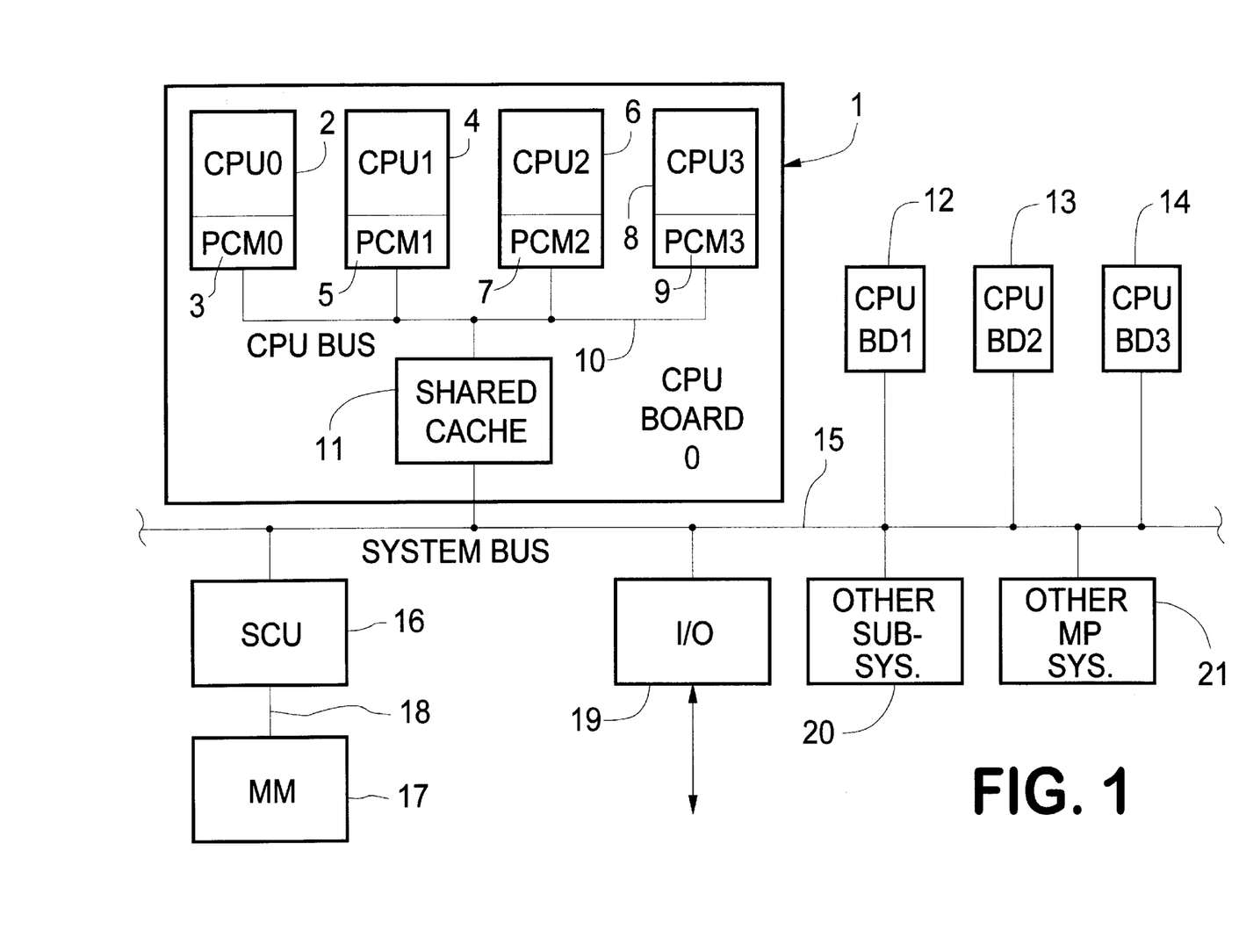
FIG. 1 is a high level block diagram of an multiprocessor computer system which is an exemplary environment for practicing the invention.

Attention is first directed to FIG. 1 which is a high level block diagram of an exemplary multiprocessor computer system incorporating the invention. A first CPU board (CPU Board "0") 1 includes four central processor units 2 (CPU "0"), 4 (CPU "1"), 6 (CPU "2"), 8 (CPU "3"). Each of the central processor units 2, 4, 6, 8 situated on the first CPU board 1 includes an integral private cache memory module, 3, 5, 7, 9, respectively. The private cache modules 3, 5, 7, 9 are each configured as "store into"; i.e., the results of each completed operation performed in the CPU are stored into the private cache. Each of the private cache modules 3, 5, 7, 9 on CPU Board "0" 1 interface with a CPU bus 10 for direct communications between the CPUs 2, 4, 6, 8.

In the exemplary system, there are three additional CPU boards 12 (CPU Board "1"), 13 (CPU Board "2") and 14

(CPU Board "3"), each of which is substantially identical to CPU board 1 although those skilled in the multiprocessor art will understand that each CPU board and each CPU on each of the boards is assigned a unique identification number to facilitate communication and cooperation among the CPUs in the system.

CPU board 1 (i.e., CPU Board "0") also includes a shared cache 11 disposed between ("bridging") the CPU bus 10 and a system bus 15. It will be understood that each of the CPU boards 12, 13, 14 also each includes a CPU bus and a shared cache, identically oriented.

A system control unit 16 serves to couple the system bus 15 to a main memory unit 18 via a memory bus 17. In addition, one or more input/output units 19 interface the system bus 15 with various input/output subsystems, not shown, to achieve input/output functions on a system basis, all as well known to those skilled in the art. Similarly, other subsystems 20, not otherwise specified or shown, may be connected to the system bus 15 to complete a given multiprocessor system, and other, complete, multiprocessor systems, represented by the block 21, may also communicate with the multiprocessor system depicted in FIG. 1 via the system bus 15. System control unit 16 also conventionally provides a multi-phase clock to all the system units.

Figure 2:
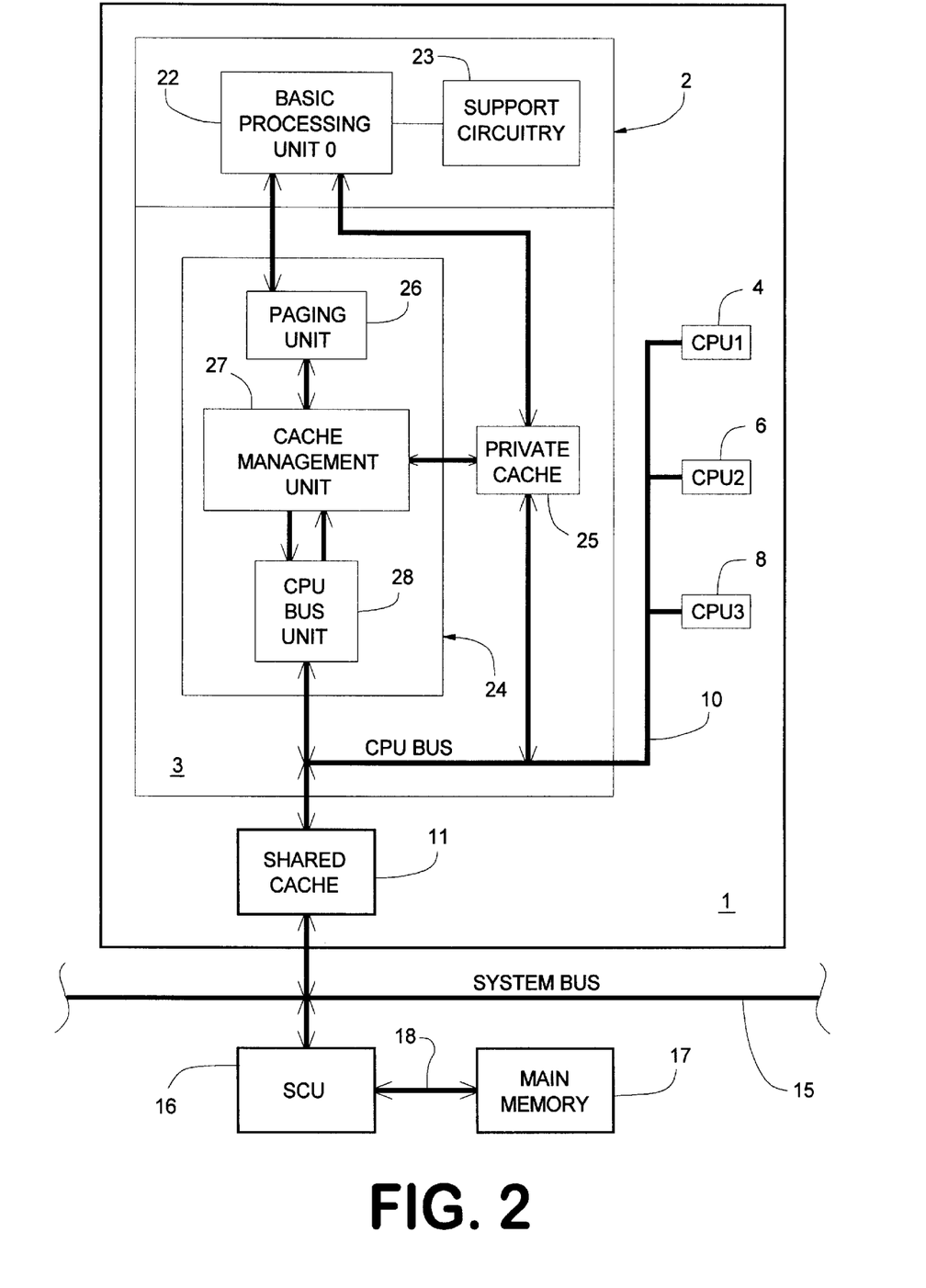
FIG. 2 is a slightly lower level block diagram showing additional details of an exemplary CPU board in the multiprocessor system of FIG. 1.

FIG. 2 is a slightly lower level block diagram of CPU "0" 2 of CPU board 1 (CPU Board "0") illustrating additional structure which is present in each CPU in the system. CPU "0" 2 includes a basic processing unit 22 and support circuitry 23 therefor.

As previously described, CPU "0" 2 also includes private cache module "0" 3 which constitutes a cache control unit 24 and a private cache 25 (which itself includes additional logic to be described below). Cache control unit 24 includes paging unit 26, cache management unit 27 and CPU bus unit 28. Paging unit 26 interfaces with basic processing unit "0" 22 and cache management unit 27. Cache management unit 27 also interfaces with private cache memory 25 and CPU bus unit 28. CPU bus unit also interfaces with CPU bus 10 and, via CPU bus 10, shared cache 11. Private cache 25 is also coupled directly to receive information from and send information to the CPU bus 10 and to receive information from and send information to basic processing unit "0" 22.

As previously described, shared cache 11 also interfaces with system bus 15 and, via system bus 15, with system control unit 16 and other systems/subsystems shown in FIG. 1. Main memory 17 may be accessed via the system control unit 16 and memory bus 18.

It will be seen that there are numerous paths for information flow among the various blocks shown in FIGS. 1 and 2. The types of information may include control, address, instructions and operands. A given CPU may directly access its own private cache module and indirectly access the private cache modules incorporated into the other CPUs on a shared CPU board. Thus, CPU "0" 2 can access, via the CPU bus 10, the shared cache 11 it shares with CPU "1" 4, CPU "2" 6 and CPU "3" 8. CPU "0" 2 can also, under defined conditions, access the private cache module of CPU "2" 6 (for example) via the CPU bus 10 to effect a local "siphon". Further, CPU "0" 2 can access (via CPU bus 10, shared cache 11 and system bus 15) the shared caches (not shown) on each of CPU Board "1" 12, CPU Board "2" 13 and CPU Board "3" 14. Still further, a given CPU may indirectly access the private cache modules (not shown) of a CPU (not shown) on another CPU board; e.g., CPU "0" on CPU board 1 (CPU Board "0") may, under defined conditions, access the private cache module of any one of the CPUs on CPU Board "2" 13 (FIG. 1) via CPU bus 10, shared cache 11, system bus 15 and the shared cache on CPU Board "2" to effect a remote "siphon".

Further yet, for example, CPU "0" 2 can access main memory 17 via CPU bus 10, shared cache 11, system bus 15, SCU 16 and memory bus 18. Still further, for example, CPU "0" 2 can access, via CPU bus 10, shared cache 11 and system bus 15, any other block shown coupled to the system bus 15 in FIG. 1 to achieve bilateral communication with input/output devices, other subsystem components and even other multiprocessor systems.

Most of these accesses can be either read or write and can be in either direction. Therefore, those skilled in the art will understand that not only must access request conflicts be conclusively resolved, but coherence among the private caches modules, shared caches and main memory must be unerringly maintained. As notoriously well known in the art, achievement of absolute coherence is an extraordinarily difficult process which becomes geometrically more complex as the number of communicating entities increases.

Detailed structure and a comprehensive discussion of the operation of the exemplary private cache module 3 is included in copending U.S. patent application Ser. No. 08/796,309, entitled MULTIPROCESSOR COMPUTER SYSTEM INCORPORATING METHOD AND APPARATUS FOR DYNAMICALLY ASSIGNING OWNERSHIP OF CHANGEABLE DATA, by Elisabeth Vanhove et al, filed Feb. 7, 1997, and assigned to a common assignee herewith, incorporated by reference herein.

Figure 3:
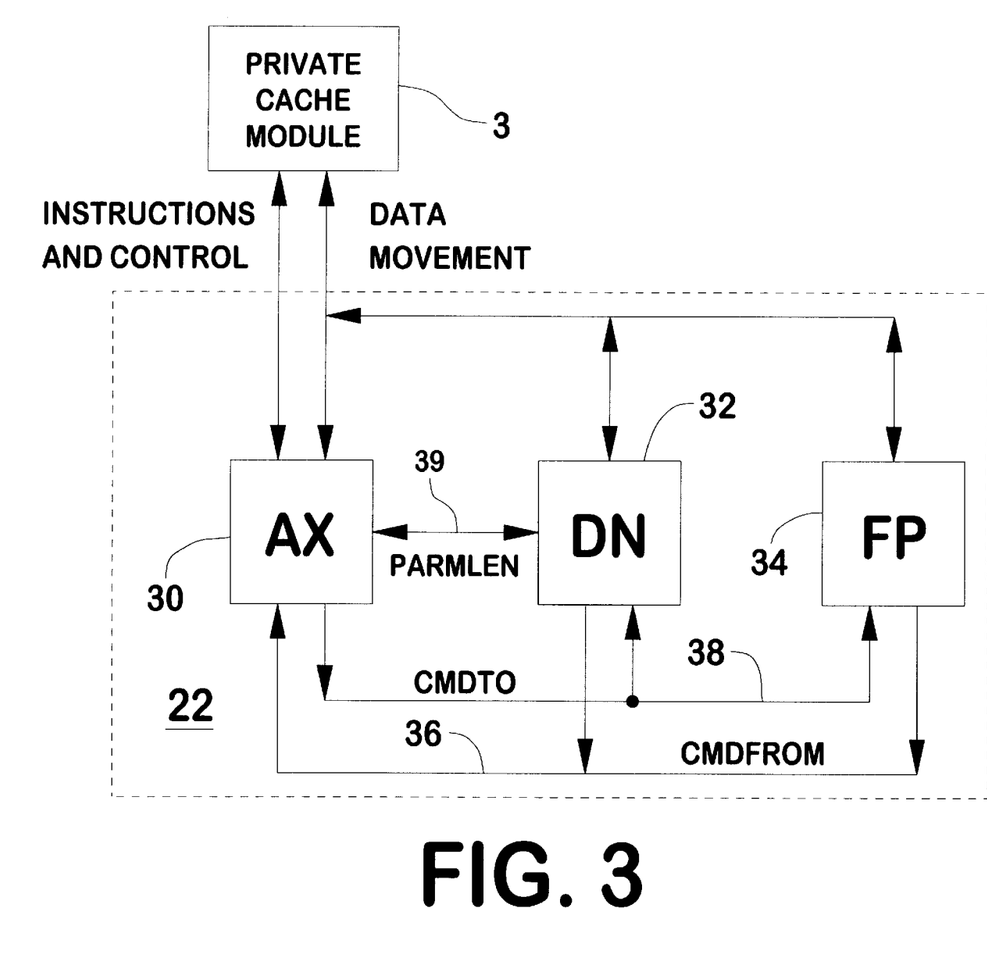
FIG. 3 is a block diagram showing additional details of a basic processing unit including within each CPU on the CPU board shown in FIG. 2.

FIG. 3 is a block diagram which shows additional details of an exemplary basic processing unit 22 in the CPU 2. An address and execution (AX) unit 30 is a microprocessing engine which performs all address preparation and executes all instructions except decimal arithmetic, binary floating point and multiply/divide instructions. The main functions performed by the AX unit 30 include:

effective and virtual address formation;

memory access control;

security checks;

register change/use control;

execution of basic instructions, shift instructions, security instructions, character manipulation and miscellaneous instructions; and     CLIMB safestore file.

Efficient scientific calculation capability is implemented in a floating point (FP) coprocessor unit 34. The FP unit 34 executes all binary floating point arithmetic. This unit, operating in concert with the AX unit 30, performs scalar or vector scientific processing.

The FP unit 34:

executes all binary and fixed and floating point multiply and divide operations;

computes 12 by 72-bit partial products in one machine cycle;

computes eight quotient bits per divide cycle;

performs modulo 15 residue integrity checks;

executes all floating point mantissa arithmetic;

executes all exponent operations in either binary or hexadecimal format;

preprocesses operands and post-processes results for multiply and divide instructions; and     provides indicator and status control.

A decimal numeric (DN) coprocessor unit 32 performs the execution of decimal numeric Extended Instruction Set (EIS) instructions. It also executes Decimal-to-Binary (DTB), Binary-to-Decimal (BTD) conversion EIS instructions and Move-Numeric-Edit (MVNE) EIS instructions in conjunction with the AX unit 30. The DN unit both receives operands from and sends results to the private cache 3. A COMTO ("command to") bus 38 and a COMFROM ("command from") bus 36 couple together the AX unit 30, the DN unit 32 and the FP unit 34 for certain interrelated operations.

Figure 4:
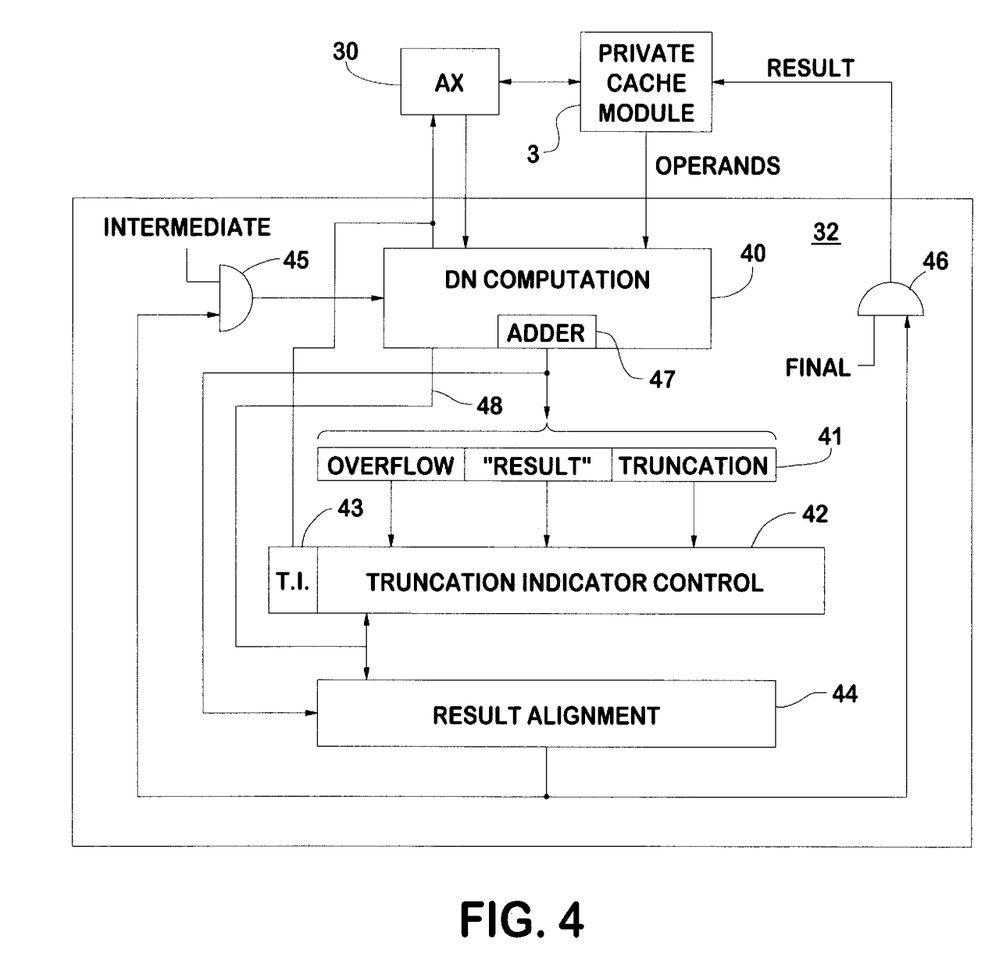
FIG. 4 is a high level block diagram of a decimal numeric coprocessor unit included in each CPU and particularly showing the environment within the decimal numeric unit in which the invention is practiced.

Attention is now directed to FIG. 4 which is a high level block diagram of the exemplary DN unit 32 in CPU0 2 and particularly showing the environment of the invention. The DN computation logic block 40, which contains much of the structure of the decimal numeric unit 32, communicates as previously described with the AX unit 30 and the private cache module 3 and carries out the actual computations assigned to the DN unit by the AX unit. An adder 47 issues the intermediate or final result of each individual computation. This result is sent to result alignment logic 44 for suitable shifting (typically, to the highest order or lowest order word boundary for efficiency in subsequent use) before being sent as a final result to the private cache module 3 or as an intermediate result back to the DN computation logic 40. The DN computation module conventionally tracks the division point positions between the overflow, "result" and truncation fields of the full result output from the adder 47 and provides this information, as represented by line 48, to the result alignment logic block 44 in order to establish the amount of shifting necessary in each case to correctly align the substantive result.

However, the full result from the adder 47, as indicated by the block 41 may, for some computations, have three components: overflow, "result" and truncation, and the boundaries between these components are variable from computation to computation. Only the "result" component may be of interest, but the overflow and truncation components must be dealt with, and this process is handled, according to the invention, by truncation indicator control logic 42 which includes a truncation indicator 43. It may be noted that field division information supplied by the DN computation block 40 to the result alignment block 44 is also sent to the truncation indicator control block 42 for reasons with will become evident below.

As previously noted, information as to whether a given coprocessor actual result has been truncated is typically supplied to the main processor (AX 30 in the example); i.e., the truncation indicator status (among other indicators) is sent to the AX unit and is available as a flag susceptible to test during subsequent operations employing the actual result. However, as also previously noted, there may be disadvantage, even if truncation has taken place to a given actual result, in setting the truncation indicator 43. Thus, attention is now directed to FIG. 5 which illustrates representative logic for selectively overriding the setting of the truncation indicator 43 under certain conditions, even when truncation has taken place and, further, even if there is a non-zero value in the overflow field of the unadjusted result.

Figure 5:
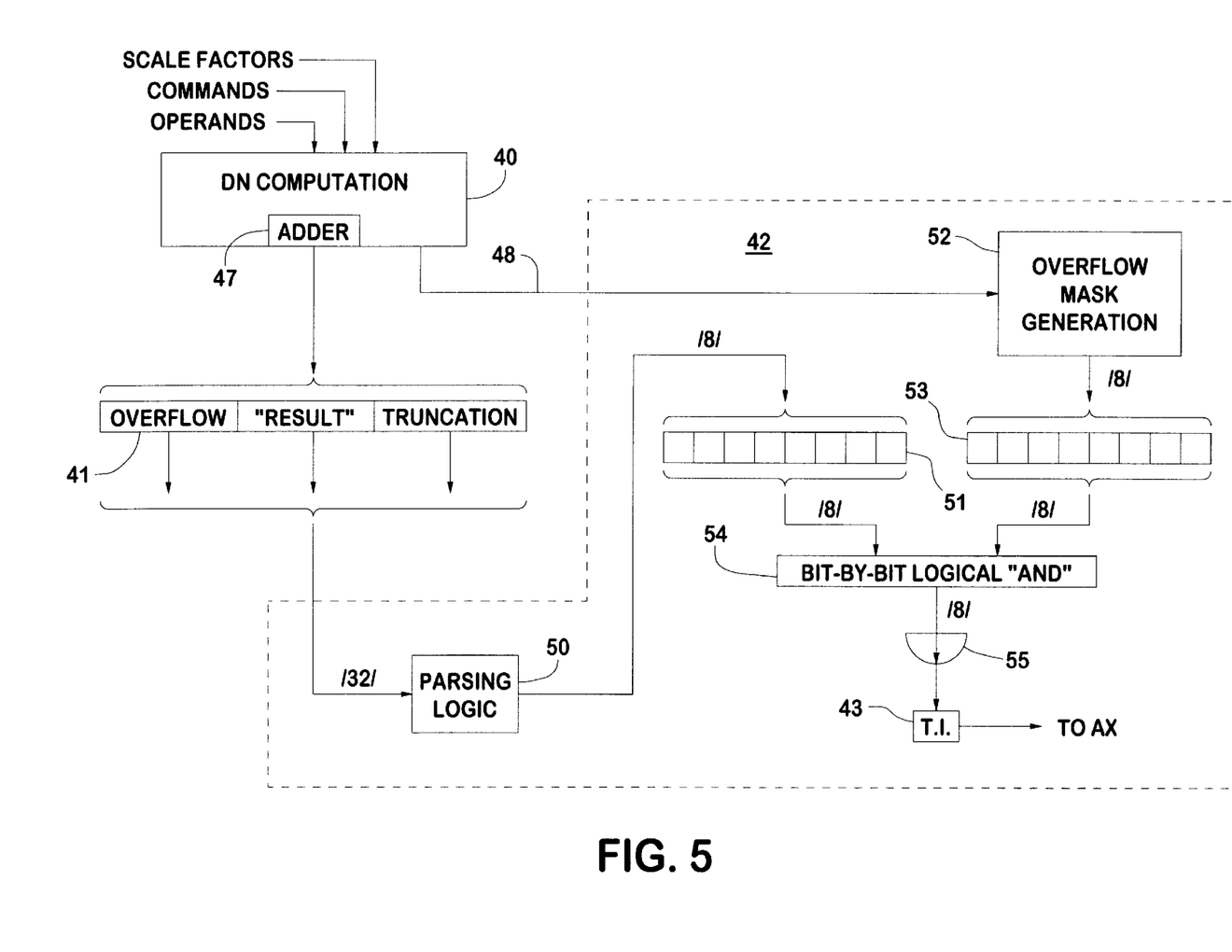
FIG. 5 is a block diagram of the mask development and application logic employed to effect the decision to set the truncation indicator.

The DN computation logic block 40 receives operands to process, suitable commands for establishing the process to be carried out on a set of operands and also scaling factor information which permits the determination of the break points between the overflow, "result" and truncation components of a computed full result word issued by the adder 47. Parsing logic block 50 conventionally divides the full unadjusted output (e.g., a 32-bit word) from the adder 47 into a plurality of segments. In the example, eight-bit bytes (each of which may represent a character or two BCD digits) segments are sequentially analyzed. Thus, each segment is transferred to a zero test register 51 whose output (eight bits) is applied to one input side of bit-by-bit logical "AND" gate array 54. The other input side of the AND-gate array 54 is driven by the output (eight bits) from a mask register 53. The eight outputs from the AND-gate array are collectively ORed in eight input OR-gate 55 such that, if any stage of the AND-gate array 54 is fully enabled during the testing process, the OR-gate will issue a logic "1" to set the truncation indicator 43, and this information is sent to the AX unit 30 as previously noted.

While the result division point between adjacent bits respectively included in the "result" and truncated fields of the full result is variable, it is not necessary to take that division point into account in the determination as to whether to set the truncation indicator 43 under the condition in which both the "result" and truncated fields of a full result are zero as this condition meets the first criteria for considering preventing the setting of the truncation indicator 43, notwithstanding the fact of truncation. Thus, the default mask held in the mask register 53 may be binary "11111111" or hexadecimal "FF" (assuming positive logic for convenience) such that any logic "1" appearing in the "result" and truncation fields will cause the truncation indicator 43 to be set.

However, the division point between the "result" field and the overflow field in a given full result word from the adder 47 must be taken into account in order to generate a mask adapted to accommodate the breakpoint between the "result" field and the overflow field because this breakpoint is subject to variation from result word to result word issued by the adder and thus may fall anywhere within an eight-bit segment resident in the zero test register 51.

Consider a series of examples which will make the operation of the invention clear. Assume, as a first example, that a 32-bit binary-coded-decimal (BCD) result word issued by the adder 47 is "00000000" (each BCD digit being conventionally represented by four bits), that the result is to be truncated and that the DN computation block 40 identifies the division point between overflow and "result" as between BCD digits two and three, BCD digit zero being the highest order digit and BCD digit seven being the lowest order digit in the word. The successive eight-bit segments (two BCD digits in the example) placed for test into the zero test register 51 (from lowest order BCD digit to highest order hexadecimal digit) are: "00", "00", "00" and "00". The corresponding successive masks placed into the mask register by the overflow mask generation logic 52 (using information supplied by the DN computation block 40 on the line 48) are, respectively (hex notation used for convenience), "FF", "FF", "0F", and "00". Therefore, no stages of the AND-gate array 54 will have been fully enabled (because of the "00000000" value of the result under test) during the entire procedure such that the OR-gate will not have been enabled, and the truncation indicator will not have been set, even though the result will have been truncated.

Consider a second example in which the full result to be tested is BCD "10000701" and the division point between overflow and "result" is between BCD digits one and two. Thus, the BCD digit pairs (lowest order to highest order) to be successively tested are "01", "07", "00" and "10", and the corresponding series of masks generated by the overflow mask generation logic 52 are "FF", "FF", "FF" and "0F". It will be seen that the two lowest order BCD digits "01" masked with "FF" will result in one of the stages in the AND-gate array 54 being fully enabled to enable the OR-gate 55 and set the truncation indicator 43. The full result did not meet the first criteria that both the "result" and truncation fields be all zeros.

Consider a third example in which the full result to be tested is BCD "0100000" and the division point between overflow and "result" is between BCD digits two and three. Thus, the BCD digit pairs to be successively tested are "00", "00", "00" and "01" and the corresponding series of masks generated by the overflow mask generation logic 52 are "FF", "FF", "FF" and "00". In this example, the six lowest order BCD digits "000000" prevent any stage of the AND-gate array 54 from being fully enabled while, for the two highest order BCD digits, it is the mask value "00" which prevents any stage of the AND-gate array 54 from being fully enabled. Thus, notwithstanding the non-zero value present in the overflow field and the fact of truncation, the truncation indicator 43 is inhibited from being set.

Of course, the operation of the subject invention is not limited to hexadecimal computation. Consider then a binary example in which the full result issued by the adder 47 is (hex notation used for convenience) "$3A000000_{16}$" and the DN computation unit 40 sends information on the line 48 to the overflow mask generation logic 52 that the breakpoint between the "result" and overflow fields is positioned between binary digits four and five, counting from the highest order. Therefore, the overflow mask generation will successively issue masks of "FF", "FF", "FF" and "07".

Figure 6:
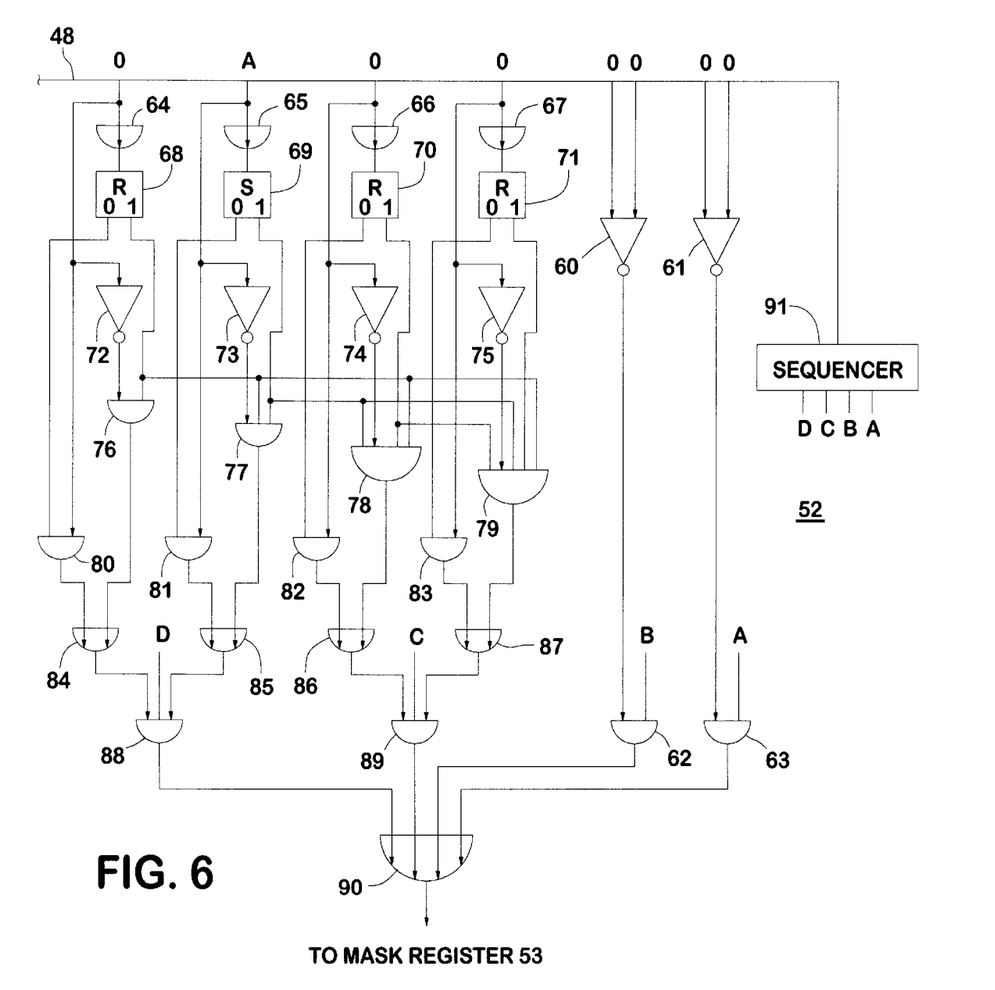
FIG. 6 is a more detailed block diagram of the mask development logic.

As previously noted, because of the information, including scalar factors, supplied to the DN computation logic block 40, the division point between the overflow and "result" fields in the full result held in the register 41 is determinable, and this information, supplied to the overflow mask generation logic block 52 on the line 48, is used to establish the mask used for the 8-bit segment in which the break point occurs in a given full result word. Referring to FIG. 6 which shows simplified exemplary logic for generating the higher order masks, assume, as in the last example set forth above, that the break point between the overflow and "result" fields for a given result is between binary digits four and five. Thus, the break point information may be sent to the overflow mask generation logic block 52 as "$0A000000_{16}$". It will be seen that it is only necessary to logically invert the four-bit half segment in which the non-zero hexadecimal digit occurs and all lower order four-bit half segments to arrive at the mask sequence which is sent to the mask register 53, starting with the lowest order eight-bit segments. Thus, the previously noted sequence for the masks employed, in this example, is obtained; viz.: "11", "11", "11" and "07". That is, "$7_{16}$" ($0111_2$) is the logical inversion of the four-bit half segment "$A_{16}$" ($1000_2$).

In the exemplary logic shown in FIG. 6, the assumption is made that the break point between the overflow and "result" fields will always fall within the upper half of the full result word issued by the adder 47 in order to simplify the logic diagram. However, it will be readily understood that the logic can be expanded to comprehend a division point anywhere in a given full result word. Further, those skilled in the art will understand that there are many approaches to accomplishing the desired sequential production of the masks, suitably adapted to an individual division point, and the logic shown in FIG. 6 is merely one approach to illustrating the invention.

Thus, as previously noted, the DN computation logic block 40 sends, on line 48 to the overflow mask generation logic block 52 shown in FIG. 6, information describing the break point between the overflow and "result" fields of a given result word and also framing information.

When the exemplary break point information word "$0A000000_{16}$", is sent to the overflow mask generation logic block 52, the lowest order four four-bit segment halves are applied to a pair of inverter arrays 60, 61, and the outputs from the inverter arrays are respectively applied as inputs (eight bits each) to AND-gate arrays 62, 63. The higher order four-bit hexadecimal digits, "$0A00_{16}$," are respectively applied as inputs to OR-gate arrays 64, 65, 66, 67. Thus, if any hexadecimal digit applied to the OR-gate arrays 64, 65, 66, 67 has a non-zero value (as, in the example, does the second highest digit which has a value of $A_{16}$), the output of that OR-gate will be at logic "1". The four outputs from the OR-gate arrays 64, 65, 66, 67 respectively each drive a latch 68, 69, 70, 71 which will therefore be set (only one of the four latches) or reset by the result of the preceeding logic decoding of the input word describing the break point of interest. In the example, only the latch 69 will be set because only the OR-gate 65 will have been enabled as a result of (at least) one of its inputs being a logic "1".

Each of the four higher order hexadecimal digits is applied to an AND-gate array, 80, 81, 82, 83, respectively, and these AND-gate arrays have control inputs taken from the "0" outputs of the latches 68, 69, 70, 71. In addition, each of the four higher order hexadecimal digits is applied to the input of an inverter array, 72, 73, 74, 75, respectively, and the respective outputs of these inverter arrays are applied as inputs to AND-gate arrays 76, 77, 78, 79, respectively, and these AND-gate arrays have control inputs taken from the "1" outputs of the latches 68, 69, 70, 71. Further, the AND-gate array 77 also receives a control.

The outputs of AND-gate arrays 80, 76 are applied as inputs to OR-gate array 84. Similarly, the outputs of AND-gate arrays 81, 77 are applied as inputs to OR-gate array 85; the outputs of AND-gate arrays 82, 78 are applied as inputs to OR-gate array 86; and the outputs of AND-gate arrays 83, 79 are applied as inputs to OR-gate array 87.

The outputs of AND-gate arrays 84 and 85 are applied to AND-gate array 88 which also has control input D. Similarly, the outputs of AND-gate arrays 86 and 87 are applied to AND-gate array 89 which also has control input C. The outputs of inverter array 60 are applied to AND-gate array 62 which also has control input B, and the outputs of inverter array 61 are applied to AND-gate array 63 which also has control input A. Sequencer 91, which receives framing information from the DN computation logic block 40, sequentially issues control signals A, B, C, D to correspondingly sequentially fully enable AND-gate arrays 63, 62, 89, 88 for sequential application of their respective outputs to OR-gate array 90 from which the mask register 53 (FIG. 5) is loaded.

The "1" output from the latch 68 is applied as a control input to AND-gate array 76 and also as an input to each of OR-gates 92, 93, 94. The "1" output from the latch 69 is applied as an input to each of OR-gates 92, 93, 94; the "1" output from the latch 70 is applied as an input to each of OR-gates 93 and 94; and the "1" output from the latch 71 is applied as an input to the OR-gate 94. The outputs from the OR-gates 92, 93, 94 are respectively employed as control inputs to AND-gate arrays 77, 78, 79. With this logical connection, if the latch 68 is set by the division point word received from the DN computation logic block 40, the AND-gate arrays 76, 77, 78, 79 will all be enabled to transfer inverted eight-bit segments to the mask register 53 for the entire upper half of the word. If the latch 69 is set (as in the example) the most significant four-bit half segment will be transferred unaltered to the mask register 53, but the second most significant four-bit segment will be transferred in inverted form when the control signal D is issued by the sequencer 91. The third and fourth four-bit half segments will be transferred to the mask register 53 in inverted form when the control signal C is issued.

Similarly, if the latch 70 is set, the non-inverted values for the first and second half segments will be transferred to the mask register 53 when the control signal D is issued, and the inverted values for the third and fourth half segments will be transferred when the control signal C is issued. If the latch 71 is set, the non-inverted values for the first and second half segments will be transferred to the mask register 53 when the control signal D is issued, and the non-inverted value for the third half segment and the inverted value for the fourth half segment will be transferred when the control signal C is issued. Finally, if none of the latches 68, 69, 70, 71 are set all the values transferred to the mask register 53 when the control signals C and D are issued will be zero; this condition occurs when the value of the overflow breakpoint is between bits 15 and 16 of the entire result word issued by the adder 47. It will be seen that the result of the operations performed by the mask development logic block 52 is to issue mask words having all logic "1"s in the full result word below the break point between the overflow and "result" fields and all logic "0"s for the overflow field, thus masking off the overflow field such that, in the event that the "result" and truncated fields are all zero, then the truncation indicator 43 will not be set even if the overflow field in the full result word is not zero, thus saving logic manipulation steps for a succeeding use of the shifted actual result.

The operation of the exemplary overflow mask generation logic block 52 will now be evident. The first two eight-bit masks sent to the mask register 53 will both be "$FF_{16}$" after being inverted in the inverter arrays 60, 61 and dispatched by the successive issuance of the A and B control signals. The two highest order hexadecimal masking digits dispatched by the issuance of the D control signal will be adjusted as described above to take into account the break point between the overflow and "result" fields and block out the effect of a non-zero overflow value on the setting of the truncation indicator 43.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a coprocessor which processes operands and issues a raw result which may include overflow, result and truncation fields and which normally sets a truncation indicator if truncation is applied to the raw result, the improvement in which:

A) a determination is made as to whether the result and truncation fields are zero;

B) a determination is made as to whether the overflow field is non-zero; and

C) if the result and truncation fields are zero, the setting of the truncation indicator is inhibited notwithstanding a non-zero value in the overflow field.

2. The improvement of claim 1 in which a break point position word indicating the break point between the overflow and result fields is processed by said first means to obtain masks of bits having a first logic value for the result and truncation fields and by said second means to obtain a mask of bits having a second logic value for the overflow field, and said third means employs said masks for the result and truncation fields for logic ANDing with the result and truncation fields and the mask for the overflow field for logic ANDing with the overflow field, the results of both logical ANDing process being logically ORed such that if the result of the logical ORing process is a predetermined one of the first and second logic values, the truncation indicator is inhibited from being set.

3. The improvement of claim 1 in which a break point position word indicating the break point between the overflow and result fields is processed to obtain masks of bits having a first logic value for the result and truncation fields and a mask of bits having a second logic value for the overflow field, the masks for the result and truncation fields being logically ANDed with the result and truncation fields and the mask for the overflow field being logically ANDed with the overflow field and the results of both logical ANDing process being logically ORed such that if the result of the logical ORing process is a predetermined one of the first and second logic values, the truncation indicator is inhibited from being set.

4. In a coprocessor which processes operands and issues a raw result which may include overflow, result and truncation fields and which normally sets a truncation indicator if truncation is applied to the raw result, the improvement which includes:

A) first means for determining if the result and truncation fields are zero;

B) second means for masking the overflow field to force a value of zero for the masked overflow field; and C) third means for testing the result, truncation and masked overflow field for a value of zero; and D) fourth means for inhibiting the setting of the truncation indicator if the test performed by the third means indicates a value of zero.

5. The improvement of claim 3 in which the first logic value is logic "1".

6. The improvement of claim 3 in which said first logic value is logic "1".

* * * * *